US009172983B2

(12) United States Patent
Koh et al.

(10) Patent No.: US 9,172,983 B2
(45) Date of Patent: Oct. 27, 2015

(54) AUTOMATIC MEDIA EDITING APPARATUS, EDITING METHOD, BROADCASTING METHOD AND SYSTEM FOR BROADCASTING THE SAME

(75) Inventors: Sih-Ping Koh, Taipei (TW); Feng-Shiuh Song, Taipei (TW); Sze-Yao Ni, Taipei (TW); Bo-Zhou Lin, Taipei (TW)

(73) Assignee: Gorilla Technology Inc., Taipei (TW)

( * ) Notice: Subject to any disclaimer, the term of this patent is extended or adjusted under 35 U.S.C. 154(b) by 888 days.

(21) Appl. No.: 13/354,751

(22) Filed: Jan. 20, 2012

(65) Prior Publication Data

US 2013/0191440 A1 Jul. 25, 2013

(51) Int. Cl.

| G06F 15/16 | (2006.01) |
|---|---|
| H04N 21/237 | (2011.01) |
| H04N 21/218 | (2011.01) |
| H04N 21/233 | (2011.01) |
| H04N 21/234 | (2011.01) |
| H04N 21/2665 | (2011.01) |
| H04N 21/81 | (2011.01) |
| G11B 27/034 | (2006.01) |
| G06F 17/30 | (2006.01) |

(52) U.S. Cl.
CPC ............ *H04N 21/237* (2013.01); *G11B 27/034* (2013.01); *H04N 21/2181* (2013.01); *H04N 21/2335* (2013.01); *H04N 21/23418* (2013.01); *H04N 21/2665* (2013.01); *H04N 21/8133* (2013.01); *G06F 17/3084* (2013.01)

(58) Field of Classification Search
USPC ......................................................... 709/203
See application file for complete search history.

(56) References Cited

U.S. PATENT DOCUMENTS

| 7,283,992 | B2 * | 10/2007 | Liu et al. ................................ 1/1 |
|---|---|---|---|
| 7,788,686 | B1 * | 8/2010 | Andrews .......................... 725/32 |
| 8,028,314 | B1 * | 9/2011 | Sezan et al. ...................... 725/46 |
| 8,204,842 | B1 * | 6/2012 | Zhang et al. ..................... 706/45 |
| 2005/0144305 | A1 * | 6/2005 | Fegan et al. .................... 709/231 |
| 2006/0167876 | A1 * | 7/2006 | Benitez et al. ..................... 707/7 |
| 2007/0086664 | A1 * | 4/2007 | Kim et al. ...................... 382/239 |
| 2008/0120345 | A1 * | 5/2008 | Duncombe ................ 707/104.1 |
| 2008/0219638 | A1 * | 9/2008 | Haot et al. ....................... 386/68 |
| 2008/0222678 | A1 * | 9/2008 | Burke et al. ..................... 725/44 |
| 2008/0263433 | A1 * | 10/2008 | Eppolito et al. .............. 715/200 |
| 2009/0006191 | A1 * | 1/2009 | Arankalle et al. .............. 705/14 |
| 2009/0007198 | A1 * | 1/2009 | Lavender et al. ............... 725/91 |
| 2009/0089352 | A1 * | 4/2009 | Davis et al. .................... 709/201 |
| 2009/0144786 | A1 * | 6/2009 | Branam et al. ................ 725/109 |
| 2009/0150210 | A1 * | 6/2009 | Athsani et al. .................. 705/10 |
| 2009/0150947 | A1 * | 6/2009 | Soderstrom ..................... 725/93 |

(Continued)

*Primary Examiner* — Melvin H Pollack
(74) *Attorney, Agent, or Firm* — Min-Lee Teng; Litron Patent & Trademark Office (57) ABSTRACT

Disclosed are an automatic media editing apparatus, an editing method, a media broadcasting method and a broadcasting system thereof. The media editing apparatus edits or labels the media clips in accordance with specified features according to the analysis of the received multimedia. A new multimedia clip can be created after reproducing the media clips. The sources of the multimedia may be the contents which are side-recorded by a plurality of area servers located at multiple areas. Followed on, the edited multimedia as required can be broadcasted to clients. The automatic media editing technology may be applied to a media broadcasting system across multiple areas. The system may include a main server and a plurality of area servers. The area server may integrate and clip the content in accordance with the specified features.

20 Claims, 8 Drawing Sheets

(56) References Cited

U.S. PATENT DOCUMENTS

| | | | |
|---|---|---|---|
| 2010/0030744 A1* | 2/2010 | DeShan et al. | 707/3 |
| 2010/0146042 A1* | 6/2010 | Kruhoeffer et al. | 709/203 |
| 2010/0250510 A1* | 9/2010 | Herberger et al. | 707/705 |
| 2010/0255890 A1* | 10/2010 | Mikkelsen et al. | 455/567 |
| 2011/0107220 A1* | 5/2011 | Perlman | 715/720 |
| 2011/0107379 A1* | 5/2011 | Lajoie et al. | 725/87 |
| 2011/0246892 A1* | 10/2011 | Hedges | 715/723 |
| 2011/0276993 A1* | 11/2011 | Ferguson | 725/30 |
| 2011/0280549 A1* | 11/2011 | Walker et al. | 386/240 |
| 2012/0060095 A1* | 3/2012 | Klappert | 715/722 |
| 2012/0192231 A1* | 7/2012 | Maa | 725/38 |
| 2012/0259994 A1* | 10/2012 | Gillies et al. | 709/231 |
| 2013/0036203 A1* | 2/2013 | Liwerant et al. | 709/219 |
| 2013/0091519 A1* | 4/2013 | McLauchlan et al. | 725/32 |
| 2013/0124984 A1* | 5/2013 | Kuspa | 715/255 |
| 2013/0166580 A1* | 6/2013 | Maharajh et al. | 707/758 |
| 2013/0276024 A1* | 10/2013 | Grant et al. | 725/34 |
| 2014/0040942 A1* | 2/2014 | Ellis et al. | 725/30 |
| 2014/0313341 A1* | 10/2014 | Stribling | 348/157 |

* cited by examiner

AUTOMATIC MEDIA EDITING APPARATUS, EDITING METHOD, BROADCASTING METHOD AND SYSTEM FOR BROADCASTING THE SAME

BACKGROUND OF THE INVENTION

1. Field of the Invention

The instant disclosure relates to an automatic media editing apparatus, an editing method, a media broadcasting method and a broadcasting system thereof; in particular, to an apparatus and the method thereof which uses the method of editing or labeling to reproduce and broadcast the video and sound clips in accordance with specified media features obtained in different areas.

2. Description of Related Art

Watching television program conventionally uses the cable television or the broadcast television, wherein the broadcast television receives signals through the antennas sent from the television station and the cable television receives cable channel signals from the operators through the cables linked to the users.

The popularity of the internet and the increasing bandwidth of the client end allows the content providers to provide users with television programs though the internet instantly, users can even watch their desired programs in all time, at all places by using the video on demand (VOD).

In this time where media information explodes, viewers require more time to search and integrate the received contents as too much information is transmitted on the internet. If there is a demand for editing, reuse and abstract the content of the information, it can only be performed through artificial means. Thus, a large amount of time and human resource is required in each procedure beginning from content-retrieving, editing, categorizing, grouping to reproducing a new content.

SUMMARY OF THE INVENTION

The object of the present invention is to provide an automatic media editing apparatus, an editing method, a media broadcasting method and a broadcasting system thereof; by using the technology of automatic media editing, the particular media source is edited or labeled based on the results of the comparisons of the media features, so as to provide the users with new, reproduced media clips. In particular, to provide a faster and more efficient way of retrieving the required media contents from the media data obtained through different areas (for instance, countries).

According to the embodiment of the instant disclosure, the automatic media editing apparatus comprises a feature database which records a variety of media features, wherein the feature values includes values configured by the system, the database can also be updated according to the preference of the users. The feature database includes graphic feature, sound feature and text feature.

The automatic media editing apparatus comprises a content-obtaining module which can obtain one or more multimedia clips. It then makes use of the content-categorizing module to input the feature values into the feature database to begin feature comparison to categorize the multimedia clips received. The apparatus includes a memory device module which stores multimedia clips temporarily After feature comparison, the content-reproducing module based on the request of the client end to obtain one or more multimedia clips in accordance with the features of the request. The features are such as the aforementioned graphic feature, sound feature and text feature, or the combination thereof. A new multimedia clip, which corresponds to the request of the client end, is formed after reproducing and is broadcasted to the request-making client end through the content-broadcasting module.

According to the automatic media editing method of the embodiment of the instant disclosure, the procedures include: obtaining one or more multimedia clips and input one or more feature value; likewise, the feature value includes graphic feature, sound feature and text feature. Then begin the media feature analysis to analyze the features of the multimedia clips, continue by comparing to find out the one or more multimedia clips in accordance with the features recorded on the requests made by the client ends and store it/them in the memory temporarily, the content stored includes the original-received multimedia clips or those which have been sorted and categorized. Followed on, reproduce the one or more multimedia clips which meet the requirement into a new multimedia clip. On the other hand, the one or more multimedia clips which meet the requirement after feature comparison will be reproduced into a new multimedia clip.

The instant disclosure further provides a media broadcasting method, particularly to broadcasting of the media contents after feature comparison and reproduction. According to this embodiment, first, set up a link between a main server and a plurality of servers located at multiple areas, then obtain the local multimedia contents from the area servers and categorize and label the clips, focusing on the requests of the client ends, the main server then checks on the area servers respectively to obtain the request-achieved clips or labels of the multimedia contents based on the configured features. Finally, a new media clip is reproduced and broadcasted to the client ends from the main server.

The embodiment of the media broadcasting system includes a main server to provide the function of user management, user login interface, program list, function of collecting popular key-words and accepting the request from a client end and a plurality of area servers.

A plurality of area servers can be located at multiple areas, for instance, different countries, the local multimedia contents obtained by the area servers, such as side-recording the local television programs or the internet packet switching, can be categorized and labeled after analysis based on the contents of the multimedia, the area servers can also exchange the categorized and labeled records.

The main server can obtain the categorized and labeled records from a plurality of area servers, so as to find out the area servers with the corresponding multimedia content through comparison based on the request of the client end, then link the client end to the corresponding area server.

The area servers of the first embodiment comprise an automatic media editing apparatus which includes feature database which can record the feature values, content-obtaining module which can obtain multimedia contents, content-categorizing module which can categorize the multimedia contents after feature comparison, memory device module, content-reproducing module which can create new multimedia contents through reproducing clips which are in accordance with specific features, then the new multimedia contents that meet the corresponding requests are broadcasted to the client ends through content-broadcasting module.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Disclosed are an automatic media editing apparatus, an editing method, a media broadcasting method and a broadcasting system thereof. Focusing on the complete procedure of editing, abstracting and reproducing a content, to propose a plan which can process automatically; it is capable of automatic file-transferring and content-obtaining base on different sources, the editing of the required content and removing of the unnecessary clips can be done regardless of the files being real or virtual, then categorizing and grouping are performed automatically to combine the clips to reproduce new contents. Thus, only a least amount of human resource is required to arrange and reuse the vast amount of contents. The viewers are also able to browse the required contents in a shorter time without the demand of searching contents from a vast amount of sources.

Figure 1:
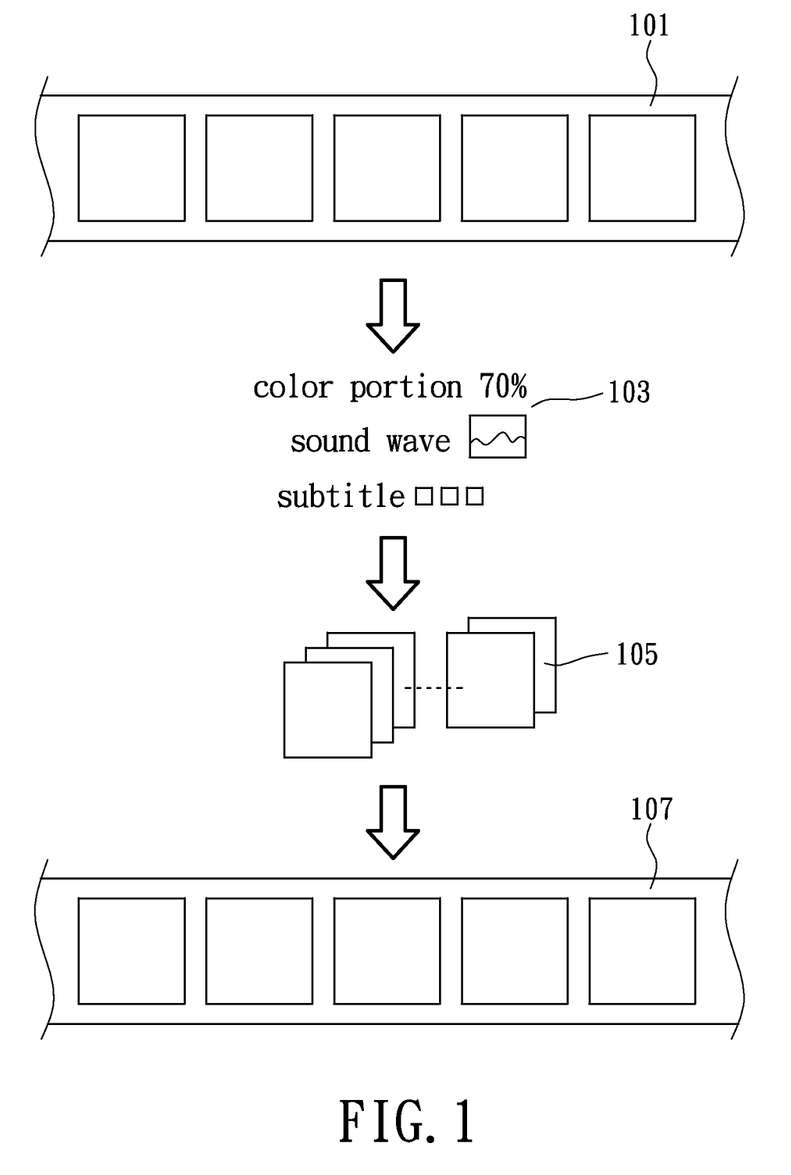
FIG. 1 shows a perspective view of an automatic media editing apparatus according to a first embodiment of the present invention.

Refer to FIG. 1 which shows the automatic media editing apparatus of the instant disclosure. The automatic media editing device is operated to obtain the original multimedia clips 101 from different medias, after the feature condition 103 sorting through graphic feature, sound feature and/or text feature, the clips which are in accordance with the feature condition are edited or labeled (such as using the time stamps of the clips); the clips that meet the requirements are expressed as edited or labeled clips 105 shown in the figure, then a new multimedia clip 107 which will be sent to the different client ends is created after reproducing. In particular, the media source can appear to be in many forms, including multimedia contents transferred through internet and television programs transferred through the network. The technology used in the automatic media editing apparatus can obtain new multimedia clips continually to reproduce new multimedia clips after auto-sorting to provide the client ends with multimedia contents unceasingly.

Figure 2:
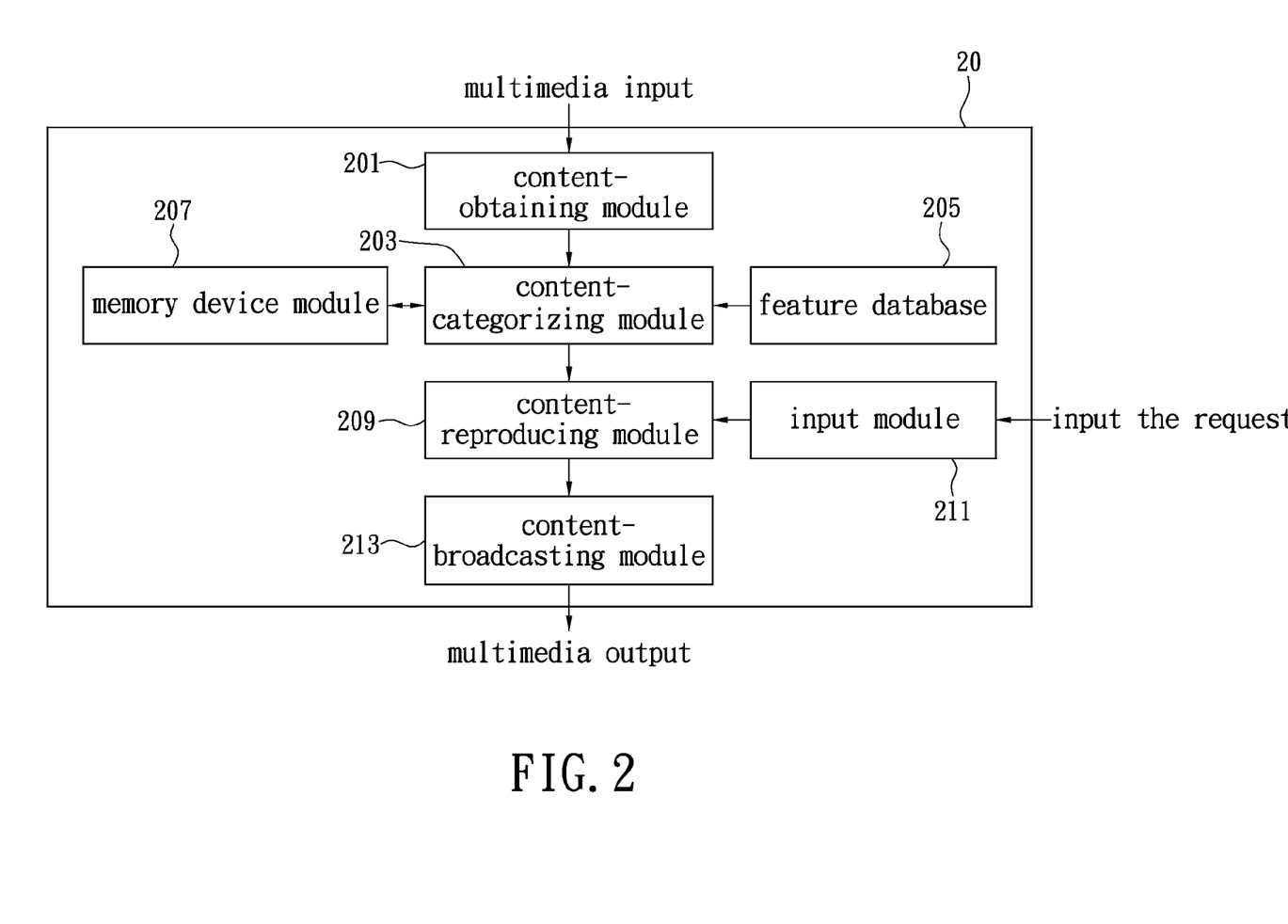
FIG. 2 shows a block perspective view of an automatic media editing apparatus according to an embodiment of the present invention.

Refer to FIG. 2 which shows a block perspective view of an automatic media editing apparatus according to an embodiment of the present invention.

The automatic media editing apparatus 20 shown in FIG. 2 includes a multimedia input which inputs contents and a multimedia output which output edited contents; based on the embodiment, the automatic media editing apparatus 20 can create a corresponding multimedia content based on the request made by the client ends, shown in the right of the FIG. 2 where the request is being inputted.

The content-obtaining module 201 in the apparatus 20 is used to obtain multimedia clips received from outside, including graphic, sound and text or the combination thereof, the sources of the multimedia clips include at least images, videos, sound data, content of television channels, internet streams and video cameras. The memory device module 207 is used to store these clips or media signals which are currently processing temporarily. The content-categorizing module 203 then receives multimedia clips obtained by the content-obtaining module 201 whereby the features of multimedia clips are obtained after analysis, then based on the different feature values from the feature database 205, the content-categorizing module 203 then compare the feature values with the multimedia clips before categorizing.

The feature database 205 records one or more feature values, the device 20 based on theses feature values to deal with different multimedia clips and the feature values mainly includes graphic feature, sound feature and text feature. Feature values recorded in the feature database 205 can be updated, and the feature values used for obtaining multimedia contents can be established in the feature database 205, features can also be collected through descriptions of the client ends. The requests made by the client ends include either graphic feature, sound feature, text feature or the combination thereof.

According to the embodiment, the graphic feature refers to the distribution of the graphic colors of different frames in media clips, when multiple frames are in accordance with a particular distribution of the graphic colors in the multimedia image, a content can be concluded from the relevant clips, the relevant parts can even be edited or labeled. For example, a big portion of the scene appears green during a football match, if the advertisements are required to be removed, the few continuing frames of insufficient green portion shall be deleted to enable the remaining frames be the contents of the football match. In this example, a time information can be included in the feature value of the multimedia image as the required multimedia clip may be broadcasted only in certain time periods, therefore, by using a time variable can achieve the required contents more accurately.

In the first embodiment, the sound feature refers to sound wave, amplitude and frequency-change, based on samples of sound wave and amplitude of particular contents, multimedia contents which are in accordance with the samples can be achieved after analysis. For instance, music programs generally have volume and frequency-change within a certain range, and the sound frequency usually increases and frequency-change becomes irregular during advertisements, therefore sorting the multimedia clips can be effective by using sound wave, amplitude and frequency-change. Likewise, time information can be included in the feature value to provide client ends with interested contents more effectively.

Based on another embodiment, feature values can be text feature, if multimedia clips include subtitles or word descriptions, those which are in accordance with the features can be obtained through key words. Likewise, time information which acts as a variable for sorting can be included in the feature value.

After comparing the feature values and categorizing multimedia clips, based on the features requested by different client ends, the content-reproducing module 209 of the automatic media editing apparatus 20 accepts the request from the input module 211, then obtain one or more multimedia clips based on the request to create a new multimedia clip before reproducing.

The content-broadcasting module 213 of the apparatus 20 then sends the new multimedia clip of the corresponded request to the request-making client ends.

According to an embodiment of the automatic media editing apparatus 20 of the instant disclosure, the apparatus 20 can be connected to the television broadcasting devices such as set-top boxes and video frequency transfer devices etc., the content-obtaining module 201 in the device 20 acts like a graphic obtaining device that connects with the relevant television broadcasting devices, the digital graphic data are obtained and transferred into the required format by side-recording through the software or hardware circuit.

When comparing the features of multimedia clips, the technology used during automatic content editing and categorizing includes the algorithm of distinguishing scenes through audio signals is disclosed in the Taiwan patent No. I319179 (Appl. No: 095133800; Filed: Sep. 13, 2006), or the method of distinguishing subtitles of films is disclosed in the Taiwan patent No. 201018198 (Appl. No: 097140019; Filed: Oct. 17, 2008). After feature distinguishing and editing, divide the content of each programs into multiple labeled clips or save into multiple video files to remove the advertisements simultaneously. Each aforementioned clip when produced can use program list, subtitle and voice content distinguishing methods to establish the related labels, enabling categorizing and grouping to be automatic when saving.

Finally, during reproduction of program abstracts, based on the feature values, category, date and time variable of the feature database 205, and the information of the attributes of the client ends etc., the multiple relevant clips are arranged into the template with beginning and ending clips. Further, the editing is also arranged into a section with multi-divided images to produce a new film content and broadcast to the client ends.

[First Embodiment of the Automatic Media Editing Method]

Figure 3:
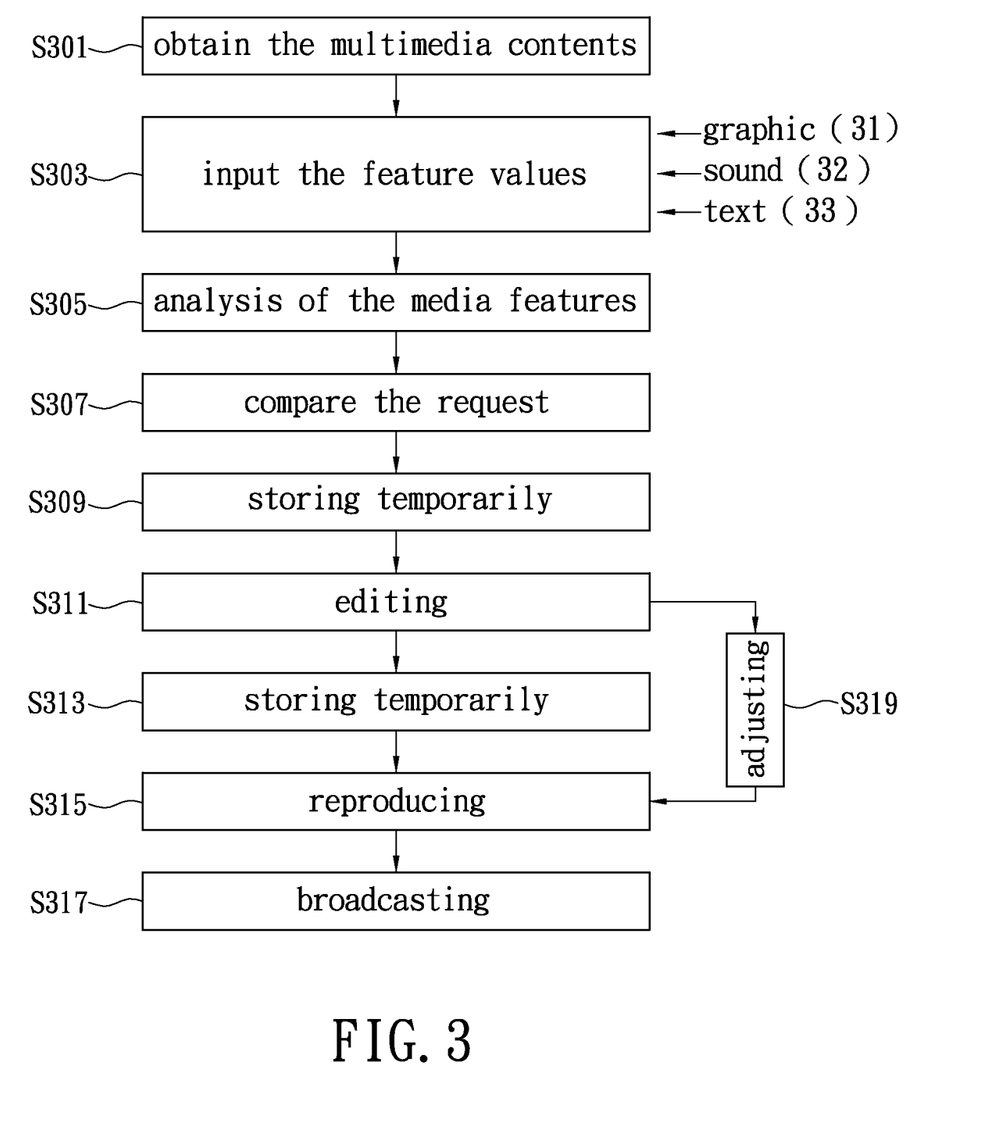
FIG. 3 shows a first flow chart of an automatic media editing method according to an embodiment of the present invention.

Referring to the flow chart of FIG. 3 which shows the automatic media editing method using the automatic media editing apparatus.

Begin the procedure by step S301, the automatic media editing apparatus obtain one or more multimedia clips through the content-obtaining module, then input the feature values (step S303) produced either from the feature database or the integration of users' attributes and key-words which users used for searching; the input feature values include graphic (31), sound (32), text (33) or the combination thereof.

After media feature analysis (step S305) performed by the software or hardware of the automatic media editing apparatus, the features of multimedia clips are obtained, for instance, color distribution or brightness of different frames in films, sound wave, amplitude, frequency-change or key-words of text feature.

Followed by step S307, compare the requests made by the client ends wherein the requests may include corresponding features, then one or more multimedia clips which are in accordance with the recorded features of the requests are produced after comparison.

After comparison, multimedia clips are stored temporarily in the memory device (step S309) to provide later procedures with required clips to edit by the apparatus (step S311), edited clips are also stored temporarily in the memory device (Step S313), then create new multimedia clips after reproduction (step S315); an adjusting procedure can be included during editing (step S319), determine whether the clips meets the requirements of the client ends before broadcasting (step S317).

The edited multimedia clips can be media contents which correspond to the client ends' requirements and unnecessary contents have been removed. For instance, client end may make request such as a football match, after comparison of graphic (such as color), sound (such as sound wave, amplitude, and frequency change), text (subtitles of relevant broadcasting contents) and time (time used on broadcasting) features, clips that are in accordance with the features are being edited to obtain a plurality of football related clips, then assemble to create new multimedia clips.

According to the automatic media editing method of the instant disclosure, the corresponding multimedia clips after feature comparison can be edited through the editing method mentioned in FIG. 3, obtaining one or more multimedia clips which meet the requirement and are combined to reproduce new multimedia clips.

According to another embodiment, the clips which are in accordance with the features can use a labeling method instead of editing whereby the one or more clips which meet the requirement are being labeled as well as time stamps recorded, the labeled clips are then combined to create new multimedia clips during reproduction.

[Second Embodiment of the Automatic Media Editing Method]

Figure 4:
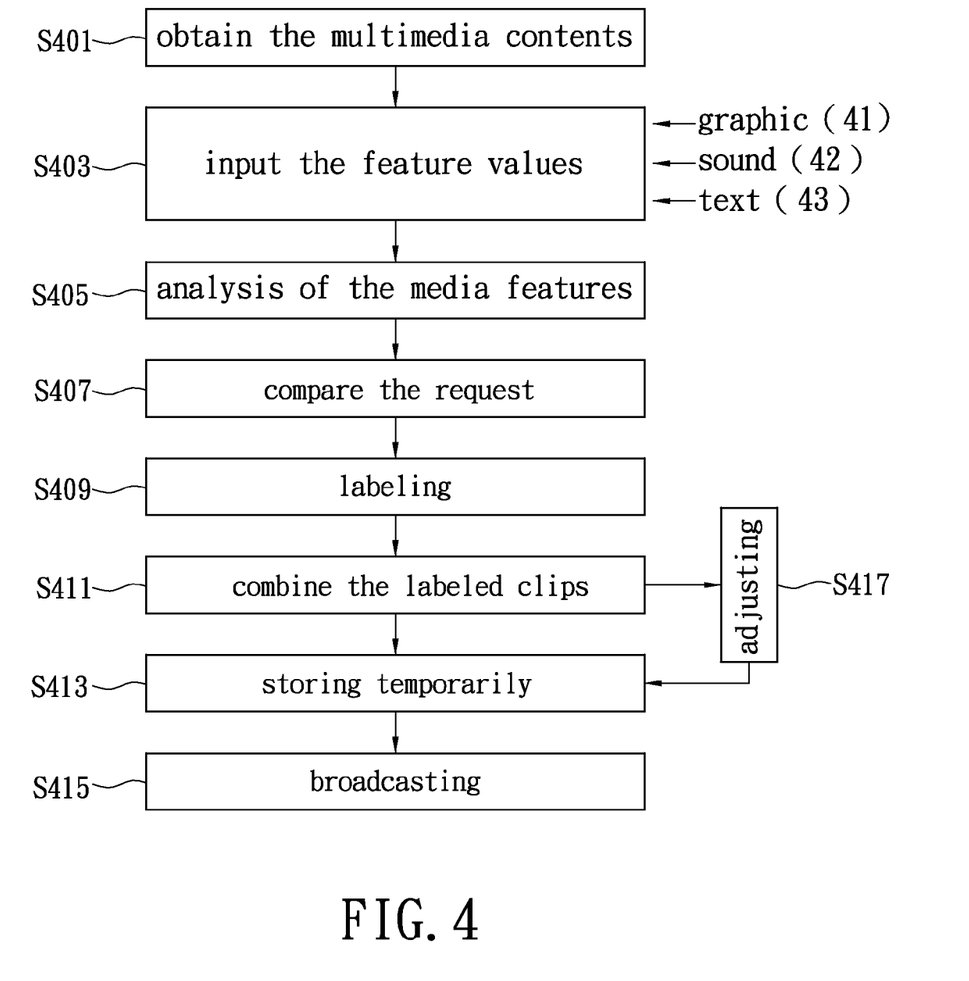
FIG. 4 shows a second flow chart of an automatic media editing method according to an embodiment of the present invention.

Referring to the flow chart of FIG. 4 which shows the automatic media editing method of the second embodiment.

Begin by step S401, the media contents are obtained through the automatic media editing apparatus, input the feature values including graphic (41), sound (42), text (43) or the combination thereof (step S403), or further includes the feature values established on the feature database or feature information collected from attributes and using habits of the client ends.

Continue with media feature analysis (step S405) whereby the features obtained from multimedia clips are compared with the input features to obtain multimedia clips that meet the requirements of particular client ends (step S407).

In this embodiment, instead of obtaining the required clips, label the multimedia clips which are in accordance with the features (step S409), for instance, the time stamps of the required clips, then record on the memory device before combining the similar labeled clips (step S411), the corresponding multimedia clips are then assembled and stored temporarily in the memory device (step S413) wherein the contents can be determined through the adjusting procedure (step S417). Finally, broadcast the assembled, new multimedia clips to the request-making client ends.

Figure 5:
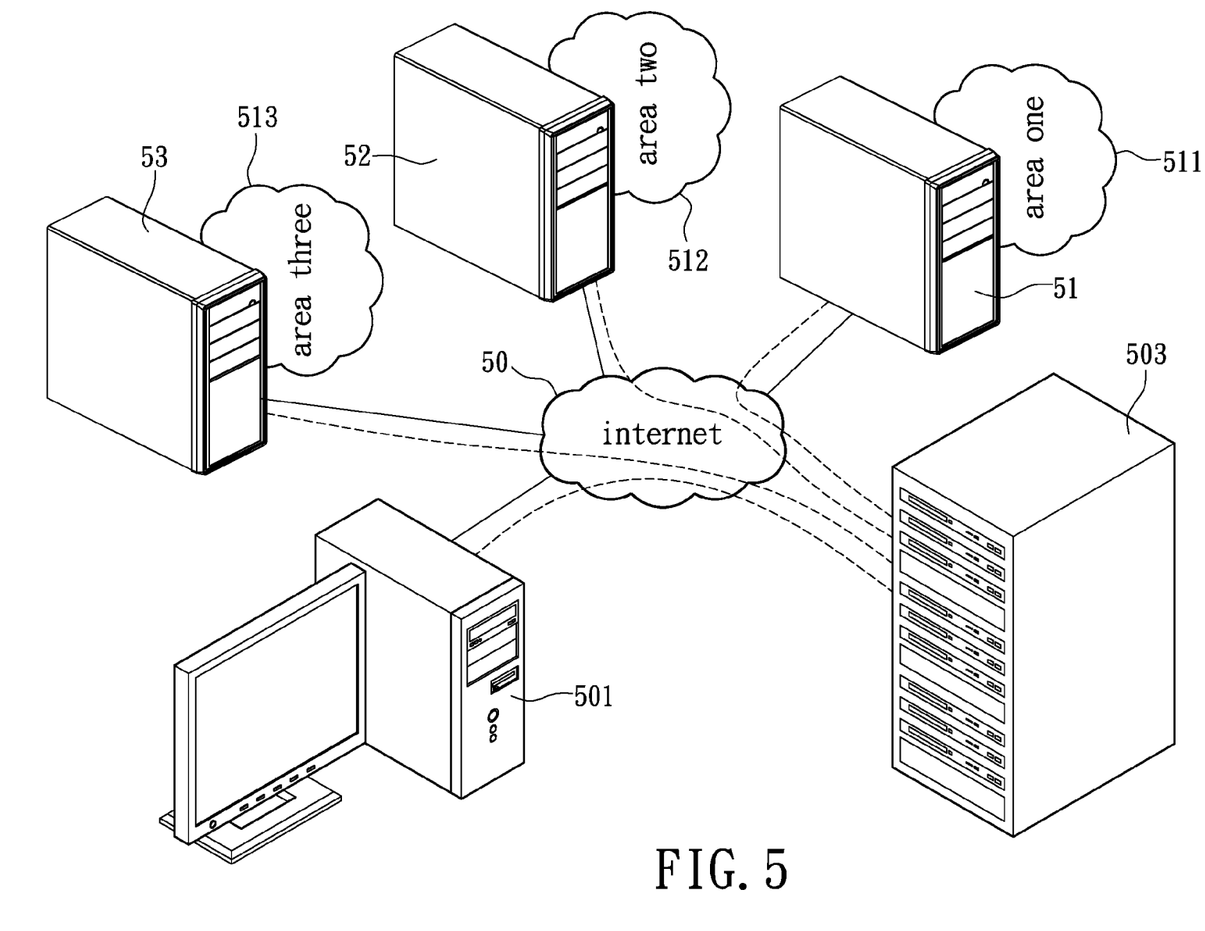
FIG. 5 shows a perspective view of a media broadcasting system according to an embodiment of the present invention.

According to the embodiment of the instant disclosure, the automate media editing apparatus and the method thereof can be applied to the media broadcasting system shown in FIG. 5. The embodiment shown in FIG. 5 includes a main server 503, multiple area servers (51, 52, 53) and an client end device 501, forming a broadcasting system which can be linked to each other through an internet 50.

According to the embodiment shown in FIG. 5 which includes a plurality of area servers located in multiple places, such as the first server 51 which locates in area one 511, the second server 52 which locates in area two 512 and the third server 53 which locates in area three 513; the main server 503 and the area servers (51, 52, 53) form a media broadcasting system using the cloud computing technology. A plurality of area servers are linked to the main server 503 through the internet 50 and are capable of exchanging information and backing up each other. The main server 503 provides user management function, user login interface, program list, popular key-words collecting function, and accepting the request of a client end.

The area servers located in multiple places establish a multimedia system using the cloud computing technology whereby the main server provides the client ends with multimedia downloading services. The main server and the multiple area servers formed a master-slave structural system, and the role of the main server can be played by any area server according to one embodiment of the invention. The main server exemplarily takes charge of managing data attributes of the multimedia, managing and storing privileges, and user management for the client ends, and payment management. A plurality of area servers can be formed by hundreds of internet nodes wherein the multimedia information can be stored on the different nodes in block forms so as to back up each other and to achieve the object of distributed processing.

Integrate and store the multimedia clips in a multimedia server (not shown) after obtaining and processing from different area servers, this conventionally refers to a relational database; time stamps are on every data, therefore the related multimedia clips are easily accessible through labeling.

In the first embodiment, the multimedia contents are obtained by the area servers, such as side-recording the content of television channels at local area or obtaining the media contents through the network, the multimedia contents are then categorized and labeled based on their features; the area servers located in multiple places can also exchange the categorized and labeled records.

In this media broadcasting system, the client end device 501 can login the system through the user login interface provided by the main server 503, and is capable of choosing multimedia contents, such as certain sport events, certain national media contents or interested contents by using the interface and the selection list, the requests made through the interface shall load the features which meet the particular requirements, the main server 503 and the different area servers then use the automatic media editing method including the feature database, the content-obtaining module, the content-categorizing module, the content-reproducing module and the content-broadcasting module to input the feature values and compare to find out the multimedia clips which are in accordance with the feature values including graphic, sound, text or the combination thereof.

In the media broadcasting system, the main server 503 is linked to the area servers located in different places and countries, the area servers continue side-recoding the local multimedia contents including the content of television channels and the internet, a plurality of area servers (51, 52, 53) are linked to each other through the internet and are backups for each other.

The main server 503 obtains the categorized and labeled records from a plurality of area servers (51, 52, 53) through the internet, when a request is received from the client end (client end device 501), the corresponding graphic, sound and/or text feature, including the particular time information can be found out, then find out the area servers of the corresponding multimedia clips though feature comparison to link the client end device 501 to the corresponding area servers, enabling the client end to download the reproduced multimedia clips through the internet 50.

Thus, the media broadcasting system can obtain a vast amount of text contents whereby the client ends obtain the required multimedia clips which have contents being sorted and features being compared through the internet.

Figure 6:
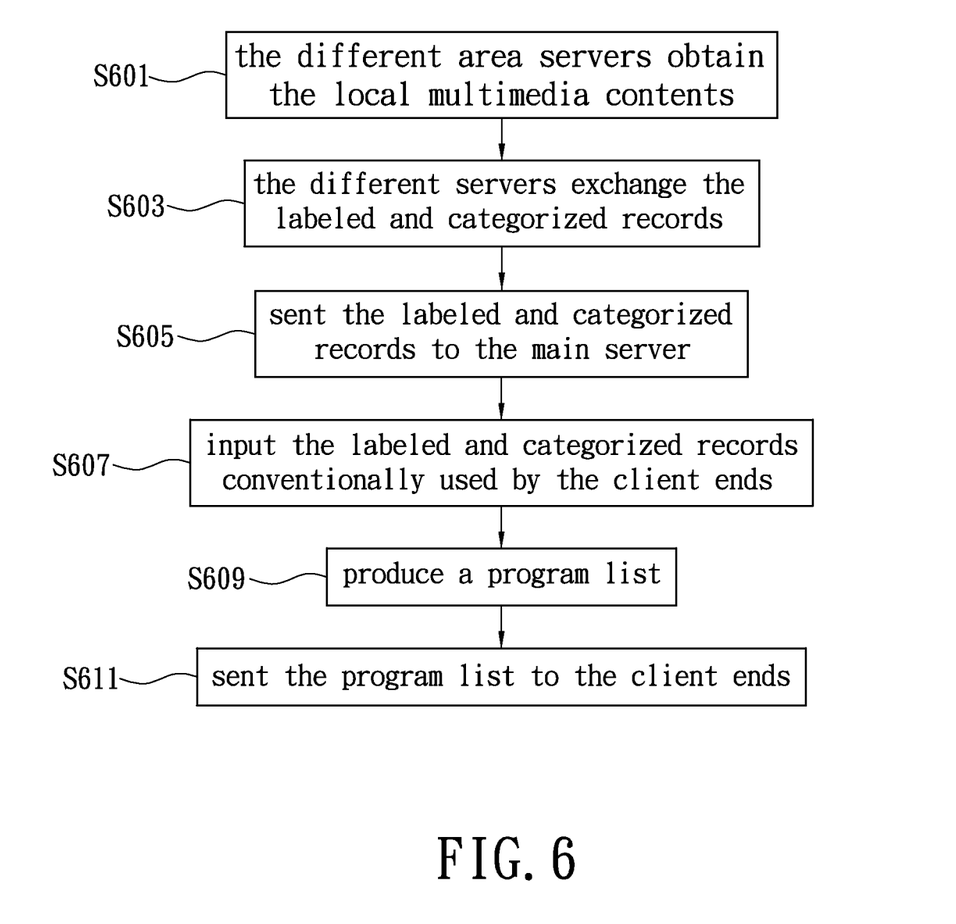
FIG. 6 shows a procedure of producing a program schedule by using the media broadcasting system of the present invention.

FIG. 6 shows a procedure of producing a program list by using the media broadcasting system. The media broadcasting system obtains local multimedia clips automatically through the area servers, a program list is then created after categorizing, labeling, and automatic editing to provide with the client ends. Refer to FIG. 6 for description of the program list production.

Begin by step S601, the different area servers obtain the local multimedia contents to categorize and label them through the automatic media editing technology. The different servers can also exchange the labeled and categorized records (step S603) to set up a media broadcasting system of vast and abundant contents.

The labeled and categorized records will be sent to the main server from the area servers through the internet (step S605), the main server then input the labeled and categorized records conventionally used by the client ends (step S607) to find out the multimedia clips which meet the requirements and produce a program list (step S609) which is later sent to the client ends (step S611).

Figure 7:
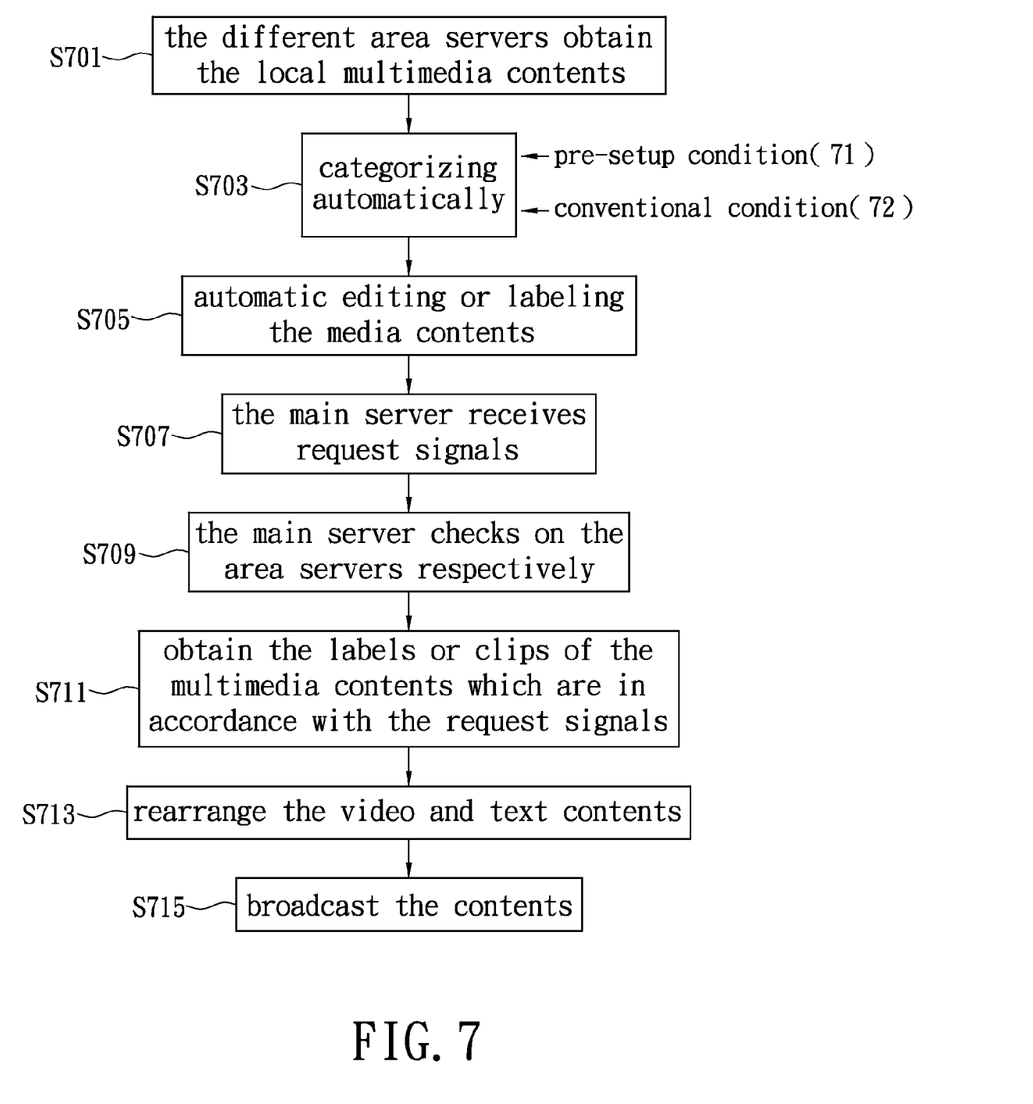
FIG. 7 shows a first flow chart of a media broadcasting method according to an embodiment of the present invention.

The media broadcasting system quotes the procedure of the embodiment of the media broadcasting method shown in FIG. 7.

To begin, link the main server to a plurality of area servers located in different places, followed by step S701, the area servers obtain local multimedia contents such as television programs from TV station, internet media contents, analog and digital broadcasts, and different video, sound information on the internet etc. to establish a media database with different varieties.

Continue with step S703, based on the configured features, the area servers begin categorizing and labeling the obtained multimedia contents wherein the multimedia clips are categorized automatically according to the pre-setup conditions (71) and the conventional conditions (72) which are produced by referring to the attributes and common-used contents of the local client ends.

In step S705, the different area servers begin automatic editing or labeling the media contents, refer to FIG. 3, 4 for description, the multimedia clips which are in accordance with the different features are edited and stored, or else labeled and recorded to create the database.

When the main server receives request signals from the client ends (step S707), the features and demands recorded on the request are further obtained by the main server, the main server checks on the area servers respectively (step S709) to compare and find out the area servers with the required contents, then let the area servers obtain the labels or clips of the multimedia contents which are in accordance with the request signals (step S711), the main server then rearrange the video and text contents to reproduce a new multimedia content (step S713) before sending the content to the request-making client ends (step S715).

Figure 8:
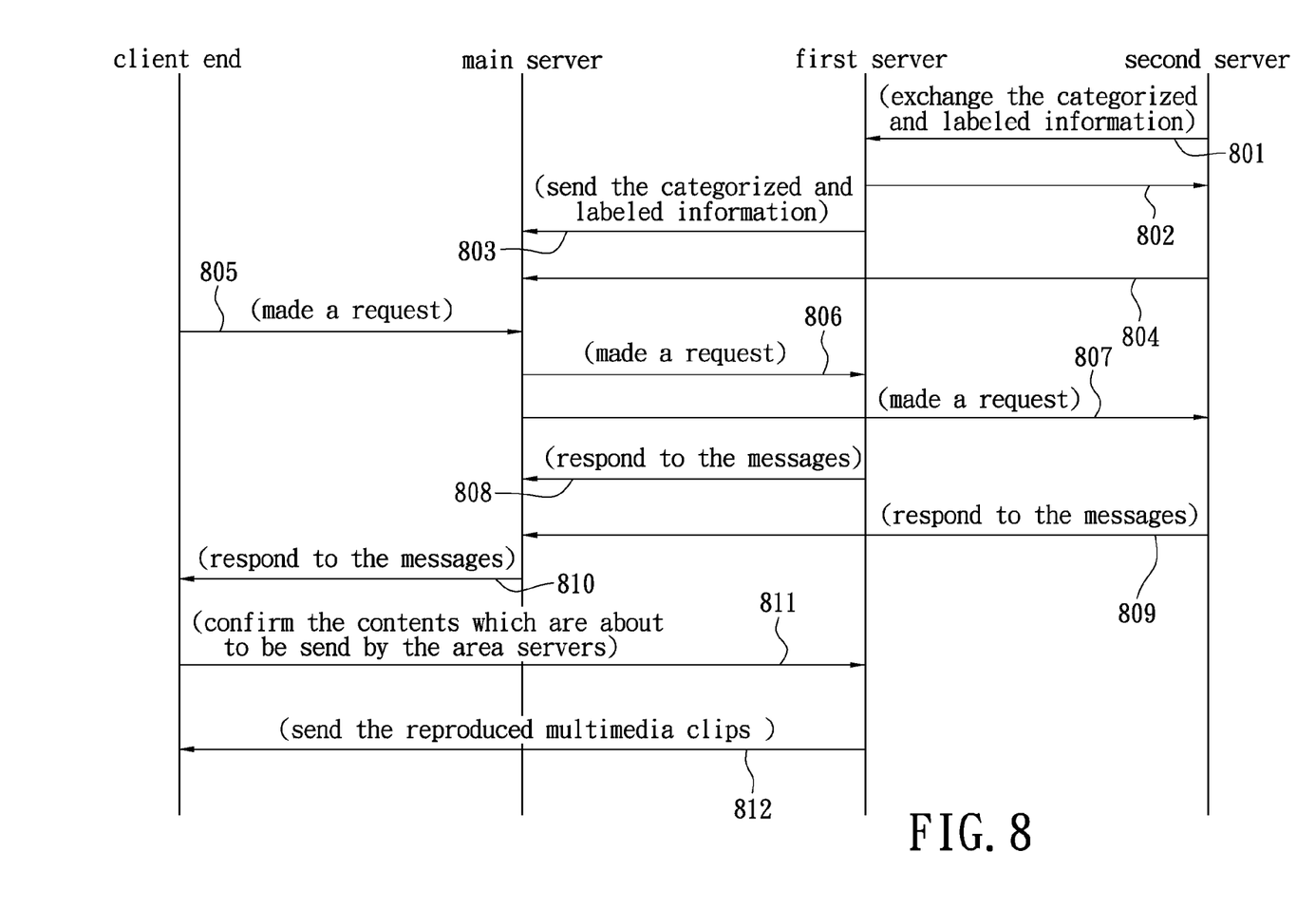
FIG. 8 shows a second flow chart of a media broadcasting method according to an embodiment of the present invention.

FIG. 8 discloses the media broadcasting procedure between the client end, the main server and the multiple area servers of the instant disclosure.

The area servers located in different places can obtain the local multimedia contents at anytime, based on the features to begin categorizing and labeling, the different area servers (such as the first server and the second server shown in Fig.) can exchange these categorized and labeled information (steps 801, 802); the first server and the second server then send these information to the main server respectively (steps 803, 804).

The client end can made a request (step 805) to the main server by using multimedia players, communication devices, computer systems or in any other form. The main server then compares the feature data loaded on this request to send a request message to the area servers, such as steps 806, 807 which send request messages respectively to the first server and the second server. The first server and the second server then respond to the messages respectively (steps, 808 809).

The responded-messages of the first and the second servers include contents that meet the requirements of the client ends, the main server then respond to the client ends (step 810) and search for the particular area servers which meet the requirements, then the client ends confirm the contents which are about to be sent by the area servers (the first server in this case) (step 811), before the area servers send the reproduced multimedia clips (step 812).

In conclusion, the automatic editing method and media broadcasting technology in this disclosure apply the procedure of automatic abstracting of the media content, reproducing and reusing. These reduces the human resources spent on obtaining, editing and arranging the existing vast amount of media contents, and is capable of providing the client ends with required multimedia contents effectively.

The descriptions illustrated supra set forth simply the preferred embodiments of the present invention; however, the features of the present invention are by no means restricted thereto. All changes, alternations, or modifications conveniently considered by those skilled in the art are deemed to be encompassed within the scope of the present invention delineated by the following claims.

What is claimed is:

1. A media broadcasting system which comprises:
   a main server which comprises a user management function, a user login interface and a program list for providing multimedia contents to client ends; and
   a plurality of area servers linked to the main server through the network, wherein the multimedia contents are obtained by the plurality of area servers, wherein each of the multimedia contents is respectively labeled and categorized according to their features by a corresponding area server;
   wherein a client end is dynamically linked to a first area server according to a request of the client end that includes specified features for matching multimedia contents, wherein the main server compares said specified features in the request with the labeled and categorized records received from the plurality of area servers, so as to locate the first area sever having a corresponding multimedia content that matches said specified features in the request.

2. The media broadcasting system according to claim 1, wherein each of the area servers is linked to a television station and a local network.

3. The media broadcasting system according to claim 1, wherein the plurality of area servers are linked to each other through the network and are backups for each other.

4. The media broadcasting system according to claim 1, wherein each of the area servers includes an automatic media editing apparatus which comprises:
   a feature database, for recording features;
   a content-obtaining module, for receiving the multimedia contents;
   a content-categorizing module, for obtaining multimedia clips and categorizing the obtained multimedia contents by checking whether each of the obtained multimedia contents comprises each of said features, respectively;
   a content-reproducing module, obtaining one or more corresponding multimedia clips based on the request, and creating a new multimedia content after reproduction; and
   a content-broadcasting module, broadcasting the new multimedia content to the client end.

5. The media broadcasting system according to claim 4, wherein the features including graphic feature, sound feature and text feature.

6. The media broadcasting system according to claim 5, wherein the features includes time information.

7. The media broadcasting system according to claim 5, wherein the graphic feature refers to the distribution of the graphic colors of different frames in the multimedia clips.

8. The media broadcasting system according to claim 5, wherein the sound feature refers to sound wave, amplitude and frequency-change.

9. The media broadcasting system according to claim 5, wherein the text feature refers to subtitles of the multimedia clips.

10. The media broadcasting system according to claim 5, wherein the graphic feature refers to the distribution of the graphic colors of different frames in the multimedia clips; the sound feature refers to sound wave, amplitude and frequency-change; the text feature refers to subtitles of the multimedia clips; and the request-corresponding feature refers to either the graphic feature, the sound feature, the text feature or the combination thereof.

11. A media broadcasting method which comprises:
    establishing a link between a main server and a plurality of area servers located in multiple areas;
    the different area servers obtaining the local multimedia contents;
    the different area servers categorizing and labeling the obtained multimedia contents according to their features;
    the different area servers exchanging the categorized and labeled records;
    the different area servers sending the categorized and labeled records to the main server;
    the main server receiving a request of a client end that includes specified features for matching multimedia contents;
    the main server comparing said specified features in the request with the labeled and categorized records received from the plurality of area servers, so as to obtain multiple clips from the plurality of area servers that match with the said specified features;
    the main server reproducing a new multimedia content according to said multiple clips from the plurality of area servers that match with said specified features; and
    broadcasting the new multimedia content to the client end.

12. The media broadcasting method according to claim 11, wherein each of the plurality of area servers is respectively linked to a television station and a local network, and the plurality of area servers are linked to each other through the network and are backups for each other.

13. The media broadcasting method according to claim 11, wherein the features for categorizing and labeling the obtained multimedia contents include graphic feature, sound feature and text feature.

14. The media broadcasting method according to claim 13, wherein the features for categorizing and labeling the obtained multimedia contents include time information.

15. The media broadcasting method according to claim 13, wherein the graphic feature refers to the distribution of the graphic colors of different frames in the multimedia clips.

16. The media broadcasting method according to claim 13, wherein the sound feature refers to sound wave, amplitude and frequency-change.

17. The media broadcasting method according to claim 13, wherein the text feature refers to subtitles of the multimedia clips.

18. The media broadcasting method according to claim 13, wherein the graphic feature refers to the distribution of the graphic colors of different frames in the multimedia clips; the sound feature refers to sound wave, amplitude and frequency-change; the text feature refers to subtitles of the multimedia clips; and the request-corresponding feature refers to either the graphic feature, the sound feature, the text feature or the combination thereof.

19. The media broadcasting method according to claim 12, wherein each of the plurality of area servers obtains the local multimedia contents through side-recording the television channel contents and acquiring the network packet switching of the local network.

20. The media broadcasting method according to claim 11 which further comprises:
- the main server producing a program list based on the received categorized and labeled records;
- sending the program list to one or more client ends; and
- the one or more client ends generating the request according to the program list.

\* \* \* \* \*